(12) United States Patent
Petenyi

(10) Patent No.: US 9,582,017 B2
(45) Date of Patent: Feb. 28, 2017

(54) METHOD OF PREVENTING INVERSION OF OUTPUT CURRENT FLOW IN A VOLTAGE REGULATOR AND RELATED VOLTAGE REGULATOR

(71) Applicant: STMicroelectronics Design and Application s.r.o., Prague (CZ)

(72) Inventor: Sandor Petenyi, Milovice Nad Labem (CZ)

(73) Assignee: STMICROELECTRONICS DESIGN AND APPLICATION S.R.O., Prague (CZ)

( * ) Notice: Subject to any disclaimer, the term of this patent is extended or adjusted under 35 U.S.C. 154(b) by 260 days.

(21) Appl. No.: 14/320,999

(22) Filed: Jul. 1, 2014

(65) Prior Publication Data

US 2015/0008871 A1    Jan. 8, 2015

(30) Foreign Application Priority Data

Jul. 2, 2013 (IT) ................................ MI2013A1107

(51) Int. Cl.
| | |
|---|---|
| *G05F 1/625* | (2006.01) |
| *G05F 1/569* | (2006.01) |
| *H02H 7/12* | (2006.01) |
| *H02J 7/00* | (2006.01) |

(52) U.S. Cl.
CPC .............. *G05F 1/625* (2013.01); *G05F 1/569* (2013.01); *H02H 7/1213* (2013.01); *H02J 7/0072* (2013.01)

(58) Field of Classification Search
CPC ............ G05F 1/56; G05F 1/575; G05F 1/562; G05F 1/565; G05F 1/569; G05F 1/563; H02M 3/158; H02M 2001/0045; H02M 3/156; H02M 3/1563

USPC .................... 323/271–276, 280–290
See application file for complete search history.

(56) References Cited

U.S. PATENT DOCUMENTS

| | | |
|---|---|---|
| 5,180,965 A | 1/1993 | Nose |
| 7,119,999 B2 | 10/2006 | Baldwin et al. |
| 7,394,307 B2 | 7/2008 | Negoro et al. |
| 7,463,468 B2 | 12/2008 | Thiery |
| 7,859,240 B1 | 12/2010 | Geynet et al. |
| 2009/0195952 A1 | 8/2009 | Meagher |
| 2009/0212753 A1* | 8/2009 | Lou ........................ G05F 1/563 323/277 |
| 2011/0169465 A1 | 7/2011 | Sudou et al. |

* cited by examiner

*Primary Examiner* — Drew A Dunn
*Assistant Examiner* — Sailesh Thapa
(74) *Attorney, Agent, or Firm* — Seed IP Law Group LLP

(57) ABSTRACT

The reversal of the flow of output current in a voltage regulator is prevented by equipping the voltage regulator of a regulation transistor controlled by an analog voltage control, having its current terminals connected between the control terminal of the fifth transistor power of the regulator and the power supply line or the common ground node of the regulator. The regulation transistor is configured to provide an electrical path of conduction between the control terminal and the power supply line or the ground node and is controlled by an analog voltage control that varies in a continuous manner between a first level, suitable to extinguish the regulation transistor, and a second level suitable for biasing it in an operating condition of deep conduction, as the difference between the supply voltage and the regulated output voltage approaching an offset voltage.

20 Claims, 7 Drawing Sheets

METHOD OF PREVENTING INVERSION OF OUTPUT CURRENT FLOW IN A VOLTAGE REGULATOR AND RELATED VOLTAGE REGULATOR

BACKGROUND

Technical Field

This disclosure relates to voltage regulators and more particularly to a method of preventing inversion of output current flow in a voltage regulator and a related voltage regulator.

Description of the Related Art

Linear voltage regulators are widely used devices in modern electronic systems to provide a regulated voltage under different operating conditions for compensating variations of load current (ILOAD), functioning temperature (TA) and input voltage (VIN) provided by an unregulated power supply.

A basic scheme of a LDO (Low Drop-Out) voltage regulator is shown in FIG. 1. It comprises a power transistor 201 in a voltage follower configuration, inserted in an output electric path from a supply line at an unregulated input voltage VIN and an output terminal on which an output regulated voltage VOUT is made available. An error operational amplifier 200 controls the power transistor 201 with an error voltage corresponding to the difference between a reference voltage VREF, representing a nominal value of the output voltage VOUT, and a scaled replica of the voltage VOUT available on the center tap of a resistive voltage divider 204, 205 connected between the output terminal and a ground terminal GND. In order to obtain low dropout performances, the error amplifier 200 is supplied by charge pump 206 to ensure a sufficiently great control voltage for power transistor 201.

The power transistor 201, that is an N-channel MOSFET in the shown example, has two intrinsic diodes 202 and 203 between the body B, drain D and source S. One of these diodes may constitute a conduction path for reverse flow of output current, if the situation is not handled. In the shown circuit, the reverse flow of the output current is handled by connecting the bulk B to a node GND at the lowest potential (ground) available in the regulator, thus keeping diodes 202, 203 always reverse biased.

With this approach, the problem of reverse current flow is only partially solved, because reverse current flow through the channel of the power MOSFET 201 is still possible. This may occur for example when the output voltage VOUT goes below its nominal level and the unregulated input voltage VIN falls below the output voltage VOUT. In this condition, the regulation loop acts to increase the output voltage VOUT up to its nominal level by forcing the gate-source voltage of the power MOSFET 201 at a maximum value, thus minimizing the on-resistance of the MOSFET channel. Therefore, the power MOSFET operates in its triode functioning region, the N-channel behaves like a resistor and the current between source S and drain D can flow in both directions depending on the polarity of the difference VOUT-VIN. If the power MOSFET is large, the on-resistance is low and thus very high reverse currents of several amperes may flow throughout the N-channel, leading to unpredictable and even destructive effects.

Moreover, the body B of the power transistor connected to the lowest potential causes body effects that influence negatively the performances of the voltage regulator.

Similar situations take place in the prior LDO regulator of FIG. 2. This LDO voltage regulator is based on P-channel power MOSFET 301 working in a common source configuration. The power transistor has two intrinsic body diodes 302, 303. During normal functioning conditions, the switch 305 is closed, thus the transistor body B is shorted to the source S, and the switches 304, 306 are open. The intrinsic diode 303 constitutes a conduction path for reverse current flow when the output voltage VOUT increases sufficiently above the input voltage VIN. To prevent this from occurring, the regulator comprises a hysteresis comparator 309 with built in offset 310, that controls the switches 304, 305, 306 as shown in the figure and enables/disables also the output stage 311 of the error amplifier 300. The hysteresis comparator 309 senses the difference between the voltages VIN and VOUT and disables the output stage 311 of the error amplifier 300 when VOUT>VIN+VOFFSET1.

The offset voltage VOFFSET1 is set to an appropriate level for ensuring that the error amplifier is not disabled during normal operation (VIN>VOUT) and that no significant current flows throughout the forward biased intrinsic diode 303 even in a design worst case condition (typically, at high temperatures).

Also in the prior regulator of FIG. 2 the problem of inversion of current flow is solved only partially, because a reverse current path may be constituted by the channel of the power MOSFET 301 when the output voltage VOUT is smaller than its nominal value and is greater than the input voltage (VOUT>VIN). In this condition, the error amplifier 300 will force the power transistor 301 in a deep conduction functioning condition, thus even a very small positive difference VOUT−VIN will cause a relatively great current to flow throughout the channel of the power MOSFET 301.

BRIEF SUMMARY

The applicants has devised a method of preventing inversion of output current flow and a related voltage regulator having a protection circuit capable of preventing inversion of current flow throughout the channel of the power transistor when the output voltage is smaller than its nominal value and the unregulated input voltage VIN drops below the output voltage VOUT.

This result has been obtained according to the method of this disclosure by providing a voltage regulator with a regulation transistor controlled by an analog control voltage and having its current terminals connected between the control terminal of the power transistor and either the supply line or a common ground node of the voltage regulator, configured to constitute an electrical conduction path from the control terminal to either the supply line or the common ground node, respectively, and by generating the analog control voltage, that varies in a continuous manner from a first level, suitable for keeping off said regulation transistor, to a second level, suitable for biasing said regulation transistor in a deep conduction functioning condition, as far as the difference between the supply voltage and the output regulated voltage approaches an offset voltage.

The analog control voltage may be generated in operation by an auxiliary operational amplifier with offset having its input terminals coupled to the output terminal and to the supply line, respectively.

According to an embodiment, the auxiliary operational amplifier with offset is adapted to generate in operation the analog control voltage that varies continuously between the first level and the second level proportionally to the difference between the supply voltage and the sum of the output regulated voltage and the offset voltage.

A battery charger comprising the above described voltage regulator is also disclosed.

The claims as filed are integral part of this specification and are herein incorporated by reference.

DETAILED DESCRIPTION

Figure 3:
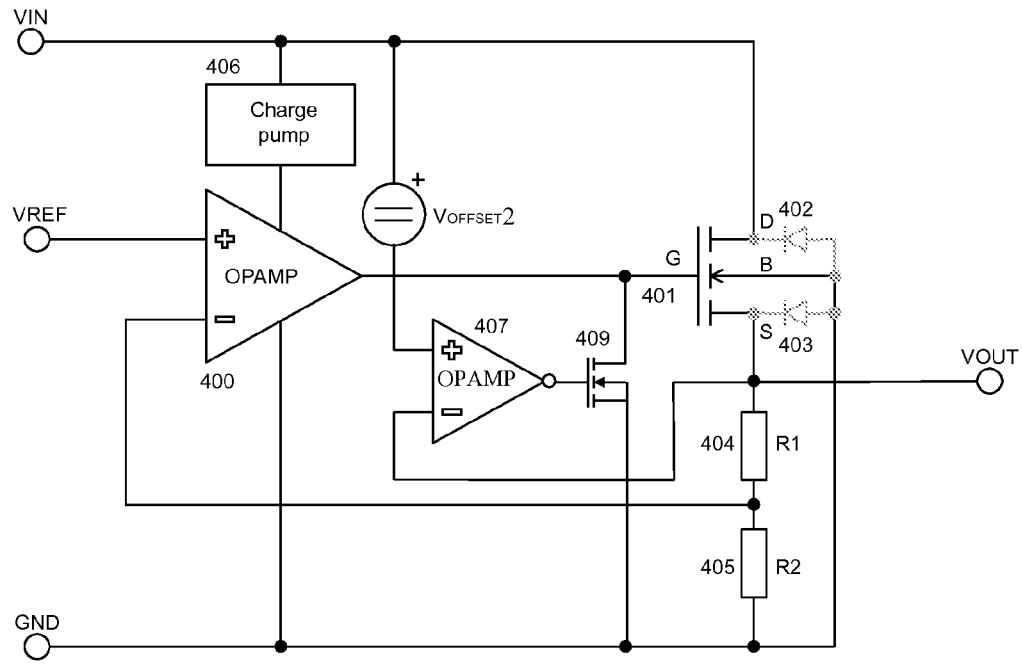
FIG. 3 is a LDO voltage regulator based on an N-channel power transistor working in voltage follower configuration according to this disclosure.
Figure 4:
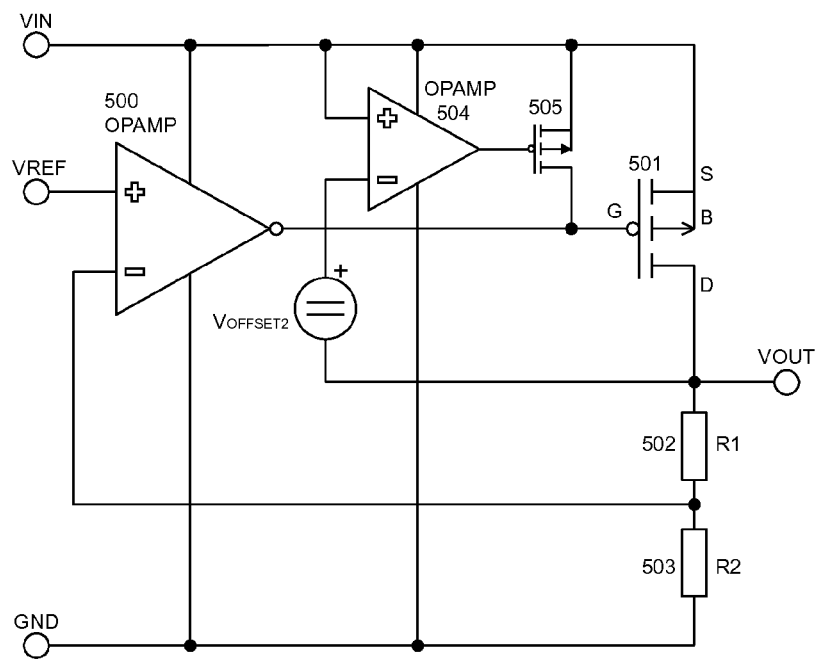
FIG. 4 is a LDO voltage regulator based on a P-channel power transistor working in common source configuration according to this disclosure.

An embodiment of a voltage regulator according to this disclosure, that uses a N-channel power MOSFET 401 for delivering an output current of the regulator, is shown in FIG. 3, and an embodiment thereof using a P-channel power MOSFET 501 (without any charge pump generator for supplying the error amplifier 500) is depicted in FIG. 4. In the ensuing description reference will be made to the embodiment of FIG. 4, though the same considerations apply, mutatis mutandis, also for the regulator of FIG. 3.

Figure 1:
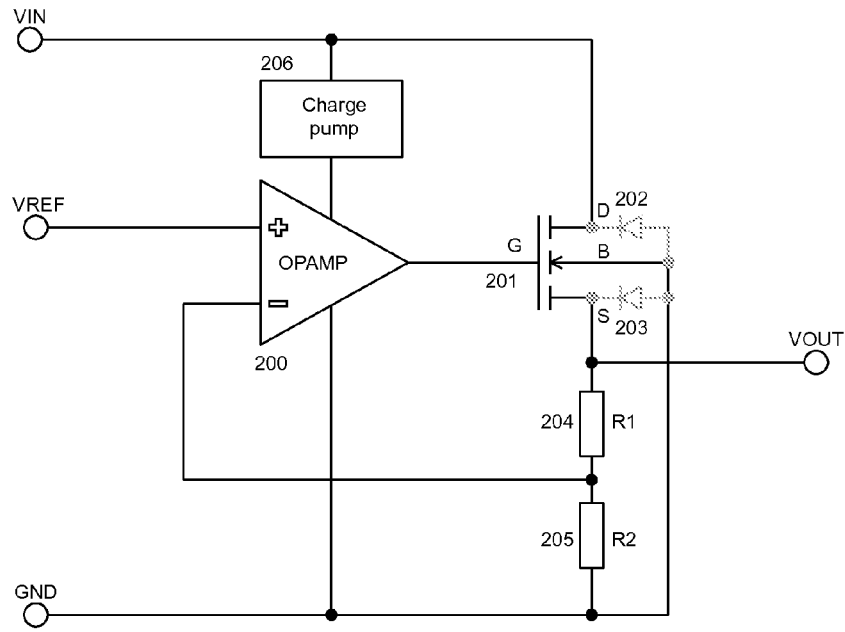
FIG. 1 is a prior LDO voltage regulator based on an N-channel power transistor working in voltage follower configuration with intrinsic reverse current protection.

Differently from the prior voltage regulator of FIG. 1, the regulator of FIG. 4 comprises: a regulation transistor 505 (409 in FIG. 3) that has its current terminals connected between the control terminal of the power transistor 501 (401) and the supply line at the input voltage VIN (common ground node GND) of the voltage regulator, such to constitute an electrical conduction path from the control terminal to the supply line (common ground node), and circuit means, that in the shown embodiment are an auxiliary operational amplifier 504 (407) with an offset voltage VOFFSET2, generating the analog control voltage, that varies in a continuous manner from a first level, suitable for keeping off the regulation transistor, to a second level, suitable for biasing the regulation transistor in a deep conduction functioning condition, as far as the difference between the supply voltage and the output regulated voltage approaches the offset voltage VOFFSET2.

According to the method of this disclosure, when the sum of the output voltage VOUT with the offset voltage VOFFSET2 approaches the input voltage VIN, the auxiliary operational amplifier 504 (407) adjusts the analog control voltage of the regulation transistor 505 (409) such to bring it in a deeper conduction state. As a consequence, the control voltage on the terminal G becomes closer to the input voltage VIN (the ground potential GND) and the output current flowing throughout the power transistor 501 (401) is progressively reduced. Therefore, when the output voltage VOUT is below its nominal value and the input voltage VIN drops below the output voltage VOUT, the power transistor 501 (401) is not brought in a deeper conduction state by the error amplifier 500 (400), as in the prior regulators of FIGS. 1 and 2, but is turned off because the regulation transistor 505 (409) shorts the gate G to the supply line at the unregulated input voltage VIN (ground GND).

In order to prevent a reverse output current from flowing throughout the intrinsic diodes of the power transistor 501 (401), the body B of the power transistor may be connected to the supply line at the unregulated input voltage VIN (ground GND). As in the prior regulator of FIG. 1, this ensures reverse polarization of all intrinsic PN junctions of the power transistor 501 (401) in any functioning condition.

Figure 5:
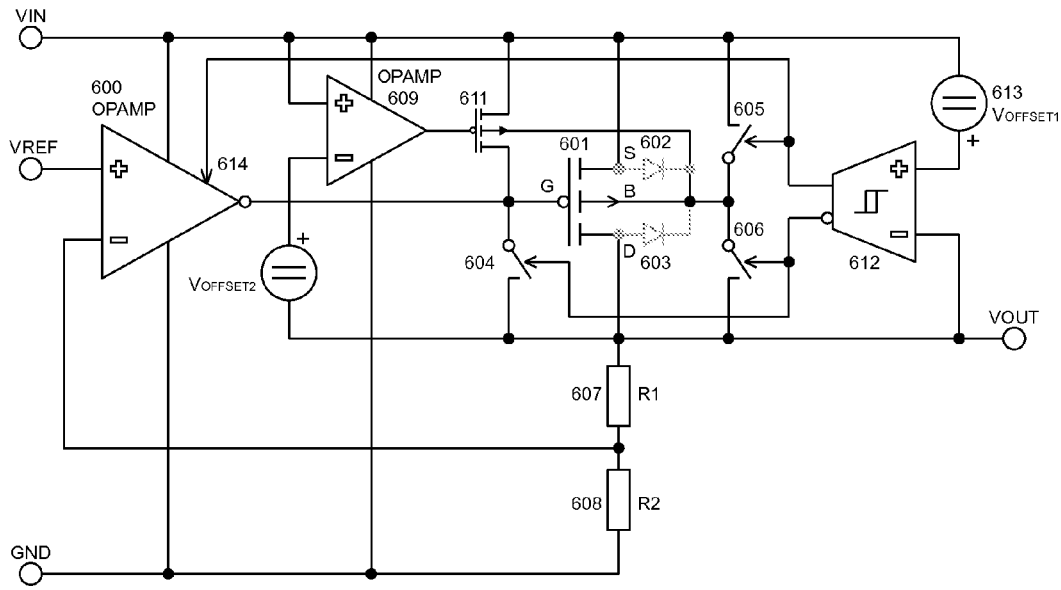
FIG. 5 is a LDO voltage regulator based on a P-channel power MOSFET comprising a complete reverse current protection circuitry according to this disclosure.

Another embodiment of a voltage regulator of this disclosure based on a P-channel power MOSFET 601 is depicted in FIG. 5. As the regulator of FIG. 4, it comprises the regulation transistor 611 and the auxiliary operational amplifier 609. In order to prevent inversion of the output current when the output voltage VOUT increases sufficiently above the input voltage VIN, the regulator comprises a hysteresis comparator 612 with built in offset 613, that turns off/on the switches 604 and 606 and turns on/off and disables/enables the output stage 614 of the error amplifier 600, as discussed referring to FIG. 2.

With this architecture, inversion of output current flow is prevented in any possible functioning condition.

In general, the offset VOFFSET1 of the hysteresis comparator and the offset VOFFSET2 of the auxiliary operational amplifier differ from each other. For example, the offset voltage VOFFSET1 may be about 100 mV and the offset voltage VOFFSET2 may be about 20 mV.

Figure 6:
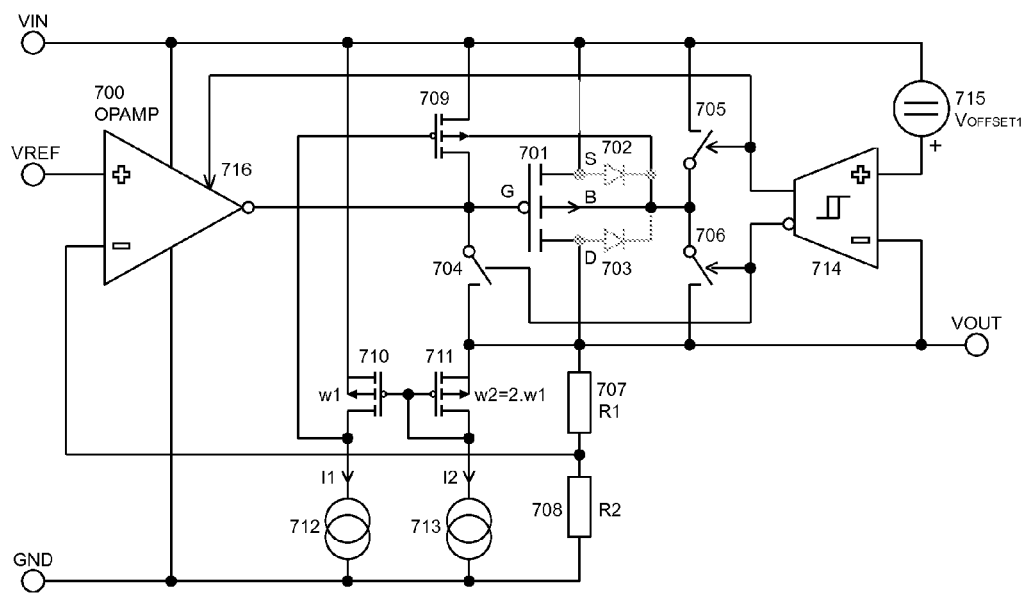
FIG. 6 is a circuit scheme of the LDO voltage regulator of FIG. 5.

FIG. 6 is a more detailed circuit scheme of the voltage regulator of FIG. 5. The auxiliary operational amplifier (609 in FIG. 5) is composed of the P-type transistors 710 and 711, the latter having an aspect ratio W2 double than the aspect ratio W1 of the former, and of the two current generators 712 and 713. The offset voltage VOFFSET2 is fixed by sizing differently the transistors 710 and 711 and by fixing the values of the current generators 712 and 713.

If currents I1 and I2 are equal to each other and the transistor sizing is W2=2*W1 then built in offset voltage is about 20 mV.

Figure 2:
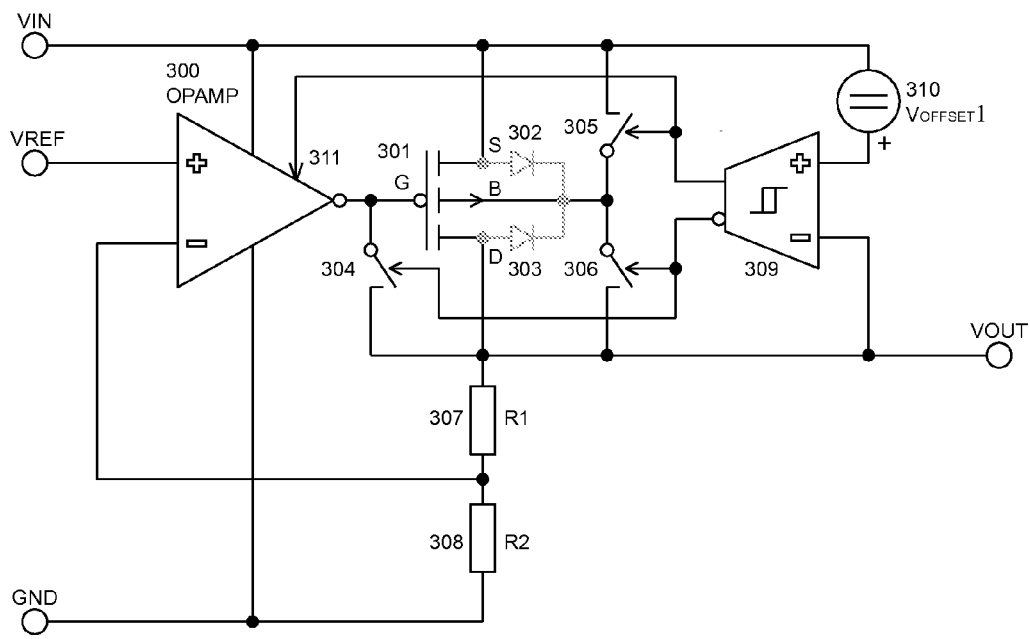
FIG. 2 is another prior LDO voltage regulator based on a P-channel power transistor with reverse current protection.
Figure 7:
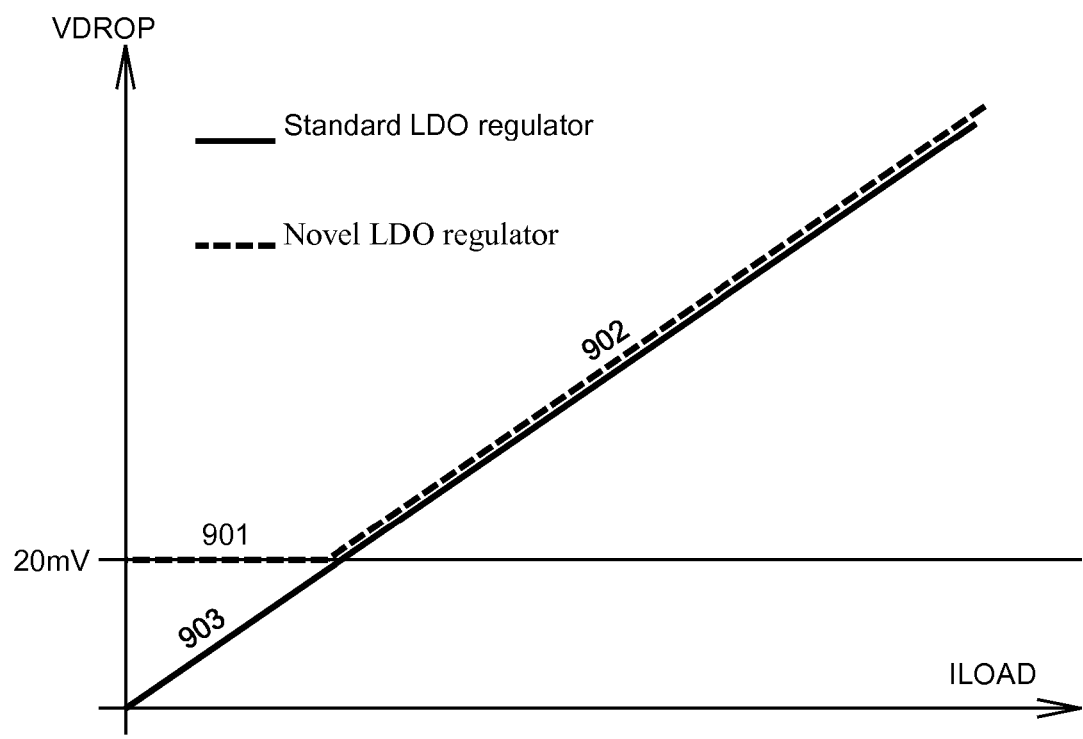
FIG. 7 is a comparison graph of dropout voltage vs. load current characteristics for standard LDO regulators and a LDO regulator according to this disclosure.

FIG. 7 compares the characteristics of output voltage drop (VDROP) vs. output current (ILOAD) of the novel voltage regulator of FIG. 5 and of the prior voltage regulator of FIG. 2, the offset voltage VOFFSET2 being equal to 20 mV. The prior regulator of FIG. 2 (characteristic 903) behaves exactly as a resistor, thus the voltage drop VDROP characteristic starts from zero. By contrast, in the novel voltage regulator of FIG. 5 the voltage drop VDROP becomes equal to the offset voltage VOFFSET2 (20 mV) when the output current ILOAD absorbed by the supplied load becomes relatively small. The minimum voltage drop VDROP of 20 mV is very low, thus it will affect in a negligible manner the performances of the regulator.

Figure 8:
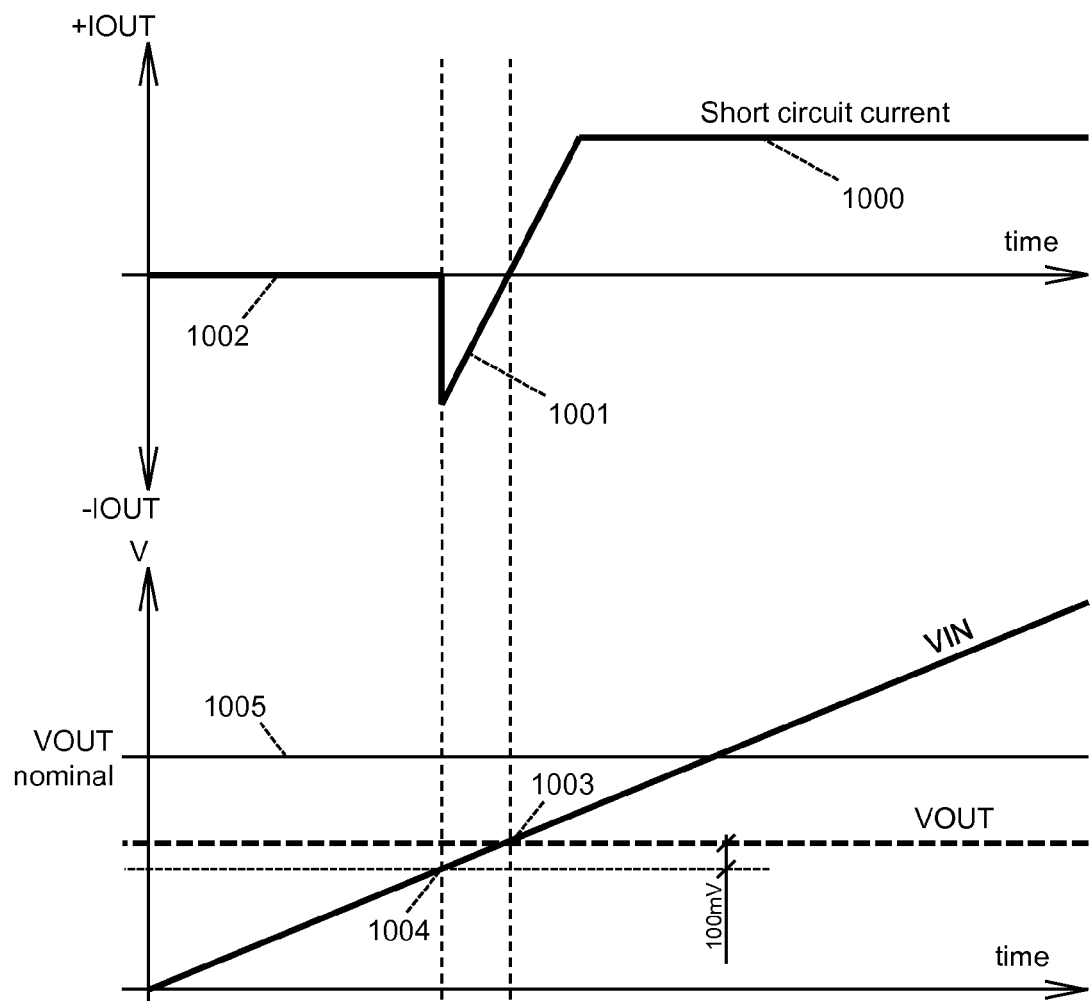
FIG. 8 is a time graph that illustrates the functioning of the prior LDO voltage regulator of FIG. 2.
Figure 9:
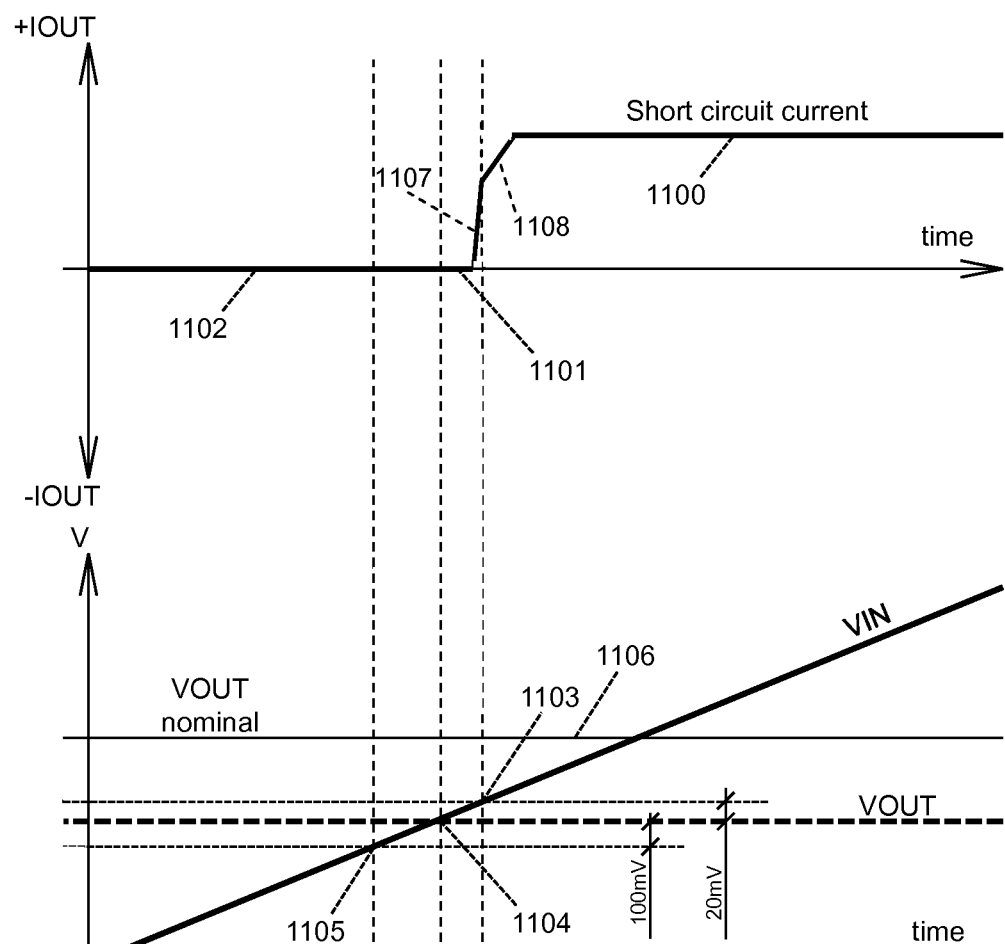
FIG. 9 is a time graph that illustrates the functioning of the novel LDO voltage regulator of FIG. 5.

The functioning of the LDO voltage regulators based on a P-channel power MOSFET of FIGS. 2 and 5 is shown in the time graphs of FIGS. 8 and 9, respectively, for VOFF- SET2=20 mV and VOFFSET1=100 mV in a functioning condition in which the output voltage VOUT is smaller than its nominal value VOUT NOMINAL. The upper graphs of FIGS. 8 and 9 depict waveforms of the output current IOUT due to the intervention of the protection circuits when the unregulated input voltage VIN increases linearly (lower graphs in FIGS. 8 and 9).

When the unregulated input voltage VIN is sufficiently below the regulated output voltage VOUT (points 1002, 1102, left side of the time graphs), the output current is null because the power transistor is off and its intrinsic body diodes are reversely biased.

When the difference VIN−VOUT is sufficiently great (points 1000, 1100, right side of the time graphs), both regulators of FIGS. 2 and 5 work in overcurrent mode, because the output voltage VOUT is below its nominal level VOUT NOMINAL. The regulators cannot increase the output voltage VOUT because, in this functioning condition, they are already delivering the maximum output current, i.e., the short circuit current (1000, 1100).

In the prior voltage regulator of FIG. 2, when the sum of the unregulated input voltage VIN with the offset VOFFSET1 (100 mV, in the shown example) attains the regulated output voltage VOUT (point 1004), the hysteresis comparator 309 enables the error amplifier 300, that biases the power transistor 301 in a conduction state and thus a reverse current flows throughout its channel. As far as the input voltage VIN increases (points 1001 and 1003), the output current IOUT becomes positive and attains its value in short circuit conditions (point 1000).

By contrast, in the voltage regulator of FIG. 5, when the sum of the unregulated input voltage VIN with the offset VOFFSET1 (100 mV, in the shown example) attains the regulated output voltage VOUT (point 1004), the hysteresis comparator 612 enables the output stage 614 of the error amplifier 600, though the regulation transistor 611 is in a deep conduction state and thus the power transistor 601 is kept off and no reverse current flows therethrough.

As far as the input voltage VIN increases above the output regulated voltage VOUT (point 1107), the on resistance of the regulation transistor 611 increases and thus the control voltage of the power transistor (that is the voltage drop on the regulation transistor 611) gradually increases and bias it in an ever deeper conduction state. If the auxiliary amplifier has a high gain, the output current will start flowing throughout the power transistor with a non negligible intensity when the input voltage VIN is only few millivolts smaller than the sum of the output voltage VOUT with the offset voltage VOFFSET2. This condition ensures that the output current will flow only in the desired direction because the input voltage VIN will be surely greater than the output voltage VOUT.

When the input voltage VIN exceeds the sum of the output voltage VOUT with the offset voltage VOFFSET2 (point 1108), the regulation transistor 611 is biased by the auxiliary operational amplifier 609 in an off state, thus the power transistor 601 is controlled only by the error amplifier 600 and will deliver an output current IOUT that increases up to its short circuit value (1100). Following the above indications, the skilled person will be capable of adjusting the offset voltages VOFFSET2 and VOFFSET1 for realizing a regulator with desired characteristics.

Figure 10:
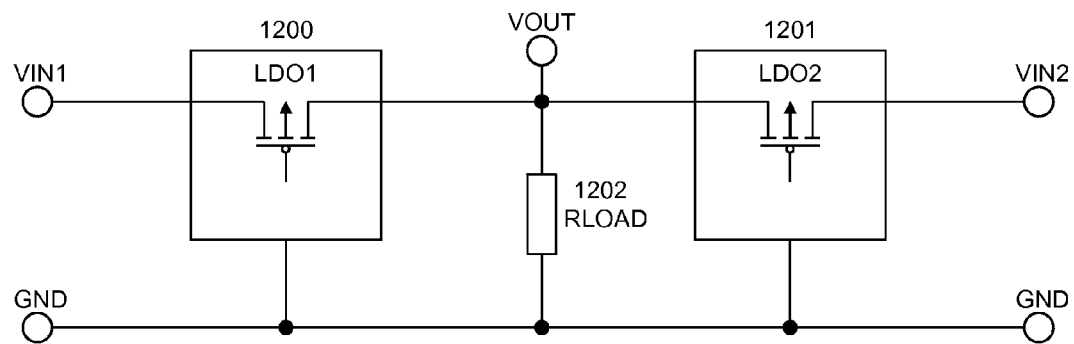
FIG. 10 shows a possible application of two LDO voltage regulators of this disclosure in which full protection against reverse currents is requested.
Figure 11:
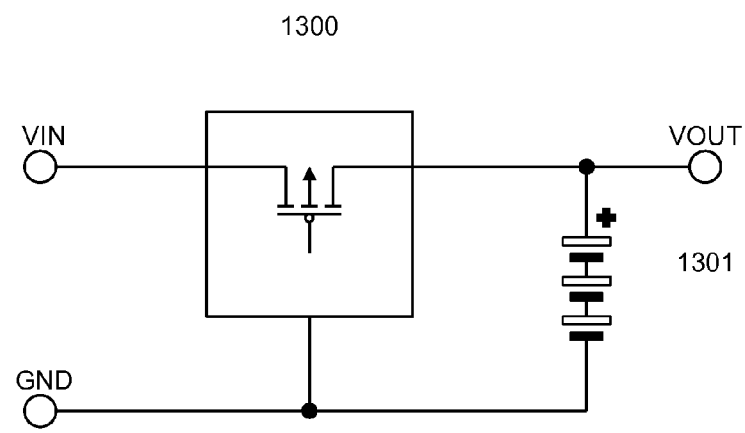
FIG. 11 is a battery charger including a LDO voltage regulator of this disclosure.

Two examples of applications of the herein disclosed voltage regulators are shown in FIGS. 10 and 11.

In FIG. 10, two LDO voltage regulators 1200, 1201 receiving in input respective unregulated supply voltages VIN1 and VIN2, are configured to supply a single load 1202.

When VIN1<VOUT or VIN2<VOUT, a functioning condition that may occur for example when one of the unregulated supply voltage sources is disconnected, the regulators 1200 and 1201 prevent inversion of the current flow from the output terminal on which the output voltage VOUT is made available back to the supply voltage sources.

FIG. 11 shows a battery charger 1300 including a LDO voltage regulator according to this disclosure. When the supply voltage VIN for charging the battery 1301 is disconnected, reverse current flow from the battery towards the supply line at the unregulated voltage VIN is prevented.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A voltage regulator configured to generate an output regulated voltage on an output terminal, comprising:
a power transistor configured to be controlled with an error voltage representing a difference between said output regulated voltage and a nominal level of said output regulated voltage, the power transistor being in an output current electric path from a supply line of the regulator to said output terminal; and
a protection circuit configured to protect the voltage regulator from inversion of current flow throughout said output current electric path, wherein said protection circuit comprises:
a regulation transistor having current terminals electrically coupled between a control terminal of the power transistor and either said supply line or a common ground node of the voltage regulator, the regulation transistor being configured to constitute a conduction electric path from said control terminal to either said supply line or said common ground node; and
an auxiliary operational amplifier configured to generate in operation, and supply to a control terminal of the regulation transistor, an analog control voltage that varies in a continuous manner from a first level, suitable for keeping off said regulation transistor, to a second level, suitable for biasing said regulation transistor in a deep conduction functioning condition, until a difference between a supply voltage and the output regulated voltage approaches a first offset voltage.

2. The voltage regulator of claim 1, wherein said auxiliary operational amplifier is an operational amplifier with offset having input terminals coupled to said output terminal and to said supply line, respectively, said first offset voltage being an offset voltage of the auxiliary operational amplifier.

3. The voltage regulator of claim 2, wherein said auxiliary operational amplifier with offset is configured to generate in operation said analog control voltage which varies continuously between said first level and said second level proportionally to the difference between the supply voltage and a sum of the output regulated voltage and said first offset voltage.

4. The voltage regulator of claim 1, wherein said power transistor and said regulation transistor are MOSFETs or BJTs of the same type either N or P, and a body of said regulation transistor is shorted to a body of said power transistor.

5. The voltage regulator of claim 4, wherein the body of the regulation transistor and of the power transistor are electrically coupled to said common ground node.

6. The voltage regulator of claim 1, further comprising an error operational amplifier having inputs electrically coupled to said output terminal and to a reference terminal configured to receive a reference voltage, the error operational amplifier being configured to generate in operation said first error voltage.

7. The voltage regulator of claim 6, further comprising:
a first controlled switch electrically coupled between the control terminal of the power transistor and said output terminal;
a controlled high-side switch electrically coupled between a body of the power transistor and the supply line of the regulator;
a controlled low-side switch electrically coupled between the body of the power transistor and the output terminal of the regulator; and
a hysteresis comparator configured to have a second offset voltage, to turn on/off said controlled high-side switch, to turn off/on said low-side switch and said first controlled switch, and to enable/disable said error operational amplifier, the hysteris comparator having input terminals coupled to said output terminal and to said supply line, respectively and configured to generate a command signal, provide the command signal to control said low-side switch and said first controlled switch, and provide an inverted replica of said command signal to control said high-side switch and said error operational amplifier.

8. A battery charger, comprising:
a voltage regulator configured to generate an output regulated voltage on an output terminal, including:
a power transistor configured to be controlled with an error voltage representing a difference between said output regulated voltage and a nominal level of said output regulated voltage, the power transistor being in an output current electric path from a supply line of the regulator to said output terminal; and
a protection circuit configured to protect the voltage regulator from inversion of current flow throughout said output current electric path, wherein said protection circuit comprises:
a regulation transistor having current terminals electrically coupled between a control terminal of the power transistor and either said supply line or a common ground node of the voltage regulator, the regulation transistor being configured to constitute a conduction electric path from said control terminal to either said supply line or said common ground node; and
an auxiliary operational amplifier configured to generate in operation, and supply to a control terminal of the regulation transistor, an analog control voltage that varies in a continuous manner from a first level, suitable for keeping off said regulation transistor, to a second level, suitable for biasing said regulation transistor in a deep conduction functioning condition, until a difference between a supply voltage and the output regulated voltage approaches a first offset voltage.

9. The battery charger of claim 8, wherein said auxiliary operational amplifier is an operational amplifier with offset having input terminals coupled to said output terminal and to said supply line, respectively, said first offset voltage being an offset voltage of the auxiliary operational amplifier.

10. The battery charger of claim 9, wherein said auxiliary operational amplifier with offset is configured to generate in operation said analog control voltage which varies continuously between said first level and said second level proportionally to the difference between the supply voltage and a sum of the output regulated voltage and said first offset voltage.

11. The battery charger of claim 8, wherein said power transistor and said regulation transistor are MOSFETs or BJTs of the same type either N or P, and a body of said regulation transistor is shorted to a body of said power transistor.

12. The battery charger of claim 11, wherein the body of the regulation transistor and of the power transistor are electrically coupled to said common ground node.

13. The battery charger of claim 8, wherein the voltage regulator includes an error operational amplifier having inputs electrically coupled to said output terminal and to a reference terminal configured to receive a reference voltage, the error operational amplifier being configured to generate in operation said first error voltage.

14. The battery charger of claim 13, wherein the voltage regulator includes:
a first controlled switch electrically coupled between the control terminal of the power transistor and said output terminal;
a controlled high-side switch electrically coupled between a body of the power transistor and the supply line of the regulator;
a controlled low-side switch electrically coupled between the body of the power transistor and the output terminal of the regulator; and
a hysteresis comparator configured to have a second offset voltage, to turn on/off said controlled high-side switch, to turn off/on said low-side switch and said first controlled switch, and to enable/disable said error operational amplifier, the hysteris comparator having input terminals coupled to said output terminal and to said supply line, respectively and configured to generate a command signal, provide the command signal to control said low-side switch and said first controlled switch, and provide an inverted replica of said command signal to control said high-side switch and said error operational amplifier.

15. A method of preventing inversion of output current flow in a voltage regulator, the method comprising:
controlling a power transistor with an error voltage representing a difference between a regulated output voltage and a nominal level of the output voltage, the power transistor being in an output current electric path from a supply line of the regulator to an output terminal;
controlling a regulation transistor by an analog control voltage, the regulation transistor having current terminals electrically coupled between a control terminal of the power transistor and either a supply line or a common ground node of the voltage regulator, the regulation transistor being configured to constitute a conduction electric path from said control terminal to either said supply line or said common ground node; and
generating said analog control voltage, which varies in a continuous manner from a first level, which keeps off said regulation transistor, to a second level, which biases said regulation transistor in a deep conduction functioning condition, until a difference between a supply voltage and the regulated output voltage approaches an offset voltage.

16. The method of claim 15, wherein generating said analog control voltage includes generating said analog control voltage that varies continuously between said first level and said second level proportionally to a difference between the supply voltage and a sum of the regulated output voltage and said offset voltage.

17. The method of claim 15, wherein generating said analog control voltage includes generating said analog control voltage using an operational amplifier configured to generate in operation, and supply to a control terminal of the regulation transistor, an analog control voltage that varies in the continuous manner from the first level, suitable for keeping off said regulation transistor, to the second level, suitable for biasing said regulation transistor in the deep conduction functioning condition, until the difference between the supply voltage and the output regulated voltage approaches a first offset voltage.

18. The voltage regulator of claim 1, wherein the supply voltage is an input voltage used to drive the voltage regulator.

19. The battery charger of claim 8, wherein the supply voltage is an input voltage used to drive the voltage regulator.

20. The method of claim 15, wherein the supply voltage is an input voltage used to drive the voltage regulator.

* * * * *